United States Patent [19]

Conner

[11] 4,123,082
[45] Oct. 31, 1978

[54] POSITIONALLY ADJUSTABLE LAWN MOWER HITCH

[76] Inventor: Joe D. Conner, Box 5695 Kilcrease Rd., Auburn, Ga. 30203

[21] Appl. No.: 794,686

[22] Filed: May 6, 1977

[51] Int. Cl.² .............................................. B60D 1/14
[52] U.S. Cl. ..................................... 280/467; 280/412; 280/490 R
[58] Field of Search .......... 280/411 R, 411 A, 411 B, 280/411 C, 490 R, 467, 412, 413, 472, 473, 415 R, 482, 490 R, 491 R, 495, 498; 56/14.9, 6

[56] References Cited

U.S. PATENT DOCUMENTS

| 1,728,098 | 9/1929 | Bork | 56/6 |
|---|---|---|---|
| 2,072,473 | 3/1937 | Baumberger | 280/490 R |
| 2,779,147 | 1/1957 | Musgrave | 280/411 C |
| 3,501,901 | 3/1970 | van der Lely | 56/6 |
| 3,514,126 | 5/1970 | Fuss | 280/411 A |
| 3,757,500 | 9/1973 | Averitt | 56/6 |
| 3,832,834 | 9/1974 | Kovacs | 280/411 C X |

FOREIGN PATENT DOCUMENTS

| 1,228,619 | 8/1960 | France | 280/467 |
|---|---|---|---|
| 213,580 | 2/1941 | Switzerland | 280/467 |

*Primary Examiner*—Joseph F. Peters, Jr.
*Assistant Examiner*—R. Schrecengost
*Attorney, Agent, or Firm*—Irvin A. Lavine

[57] ABSTRACT

A hitch construction for connecting a push-type lawn mower for towing behind a riding mower on either side. The towing mower has a trunnion with a vertical axis for receiving the finger portion of an L-shaped rod, and a pair of releasable securing devices for the arm of the rod, one on either side of the trunnion. The towed mower is provided with an upstanding post, a block adjustably positioned on said post, and an adjustable connection between said block and the arm of said rod. The post is secured to the towed mower by one of a plurality of connectors, cooperating with the particular construction of the towed mower.

15 Claims, 10 Drawing Figures

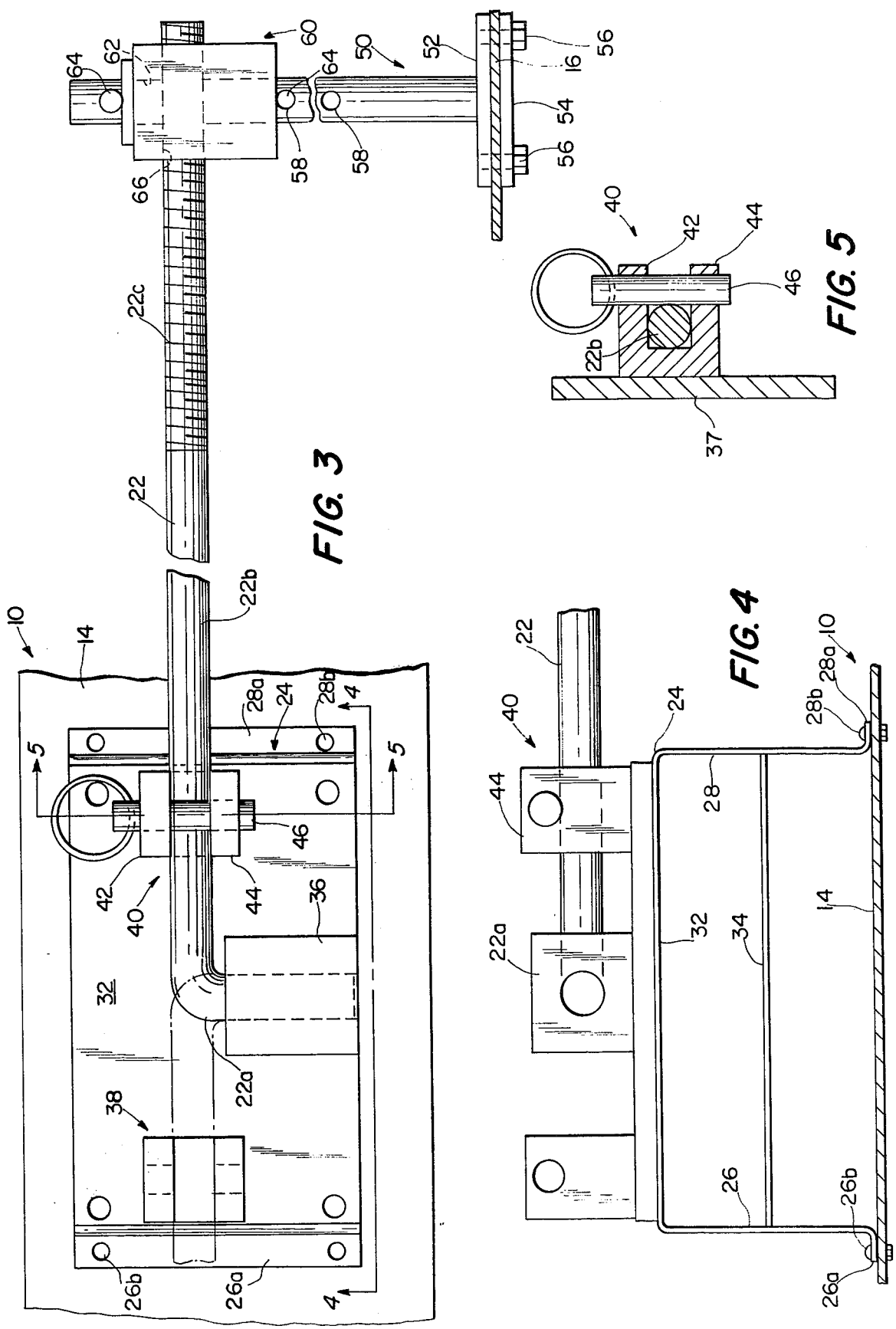

POSITIONALLY ADJUSTABLE LAWN MOWER HITCH

BACKGROUND OF THE INVENTION

The present invention relates to hitches for connecting a towing lawn mower to a towed lawn mower.

There have been used for many years a towing or powered vehicle, having a hitch to connect it to a towed vehicle. Generally, these have included tractors, towing various farm implements, and in more recent years, there has been suggested the provision of a riding mower for the mowing of a lawn, together with a hitch for towing a push-type lawn mower behind and laterally of the towing lawn mower of the riding type.

Various configurations of such hitches have been provided, including a number in which a link or links has extended behind the towing lawn mower, connected to a bar or bars extending laterally to each side, and with a pair of towed lawn mowers connected to the laterally extending bar, so as to mow a pair of paths laterally adjacent the path moved by the towing lawn mower.

In addition, there have been provided a number of suggestions in the prior art whereby a towing vehicle, such as a tractor or a lawn mower, has towed laterally behind it, by a hitch arrangement, a mower powered only from its own power source, or from the power take off of the tractor, as the case may be. These did not provide, however, for the ready alternate positioning of the single towed lawn mower from being laterally on one side to being laterally on the other side. This, therefore, was a deficiency, because of the fact that in certain situations, it is not always possible to have the towed mower extending from the same side of the towing mower.

Further, the hitches provided in the prior art were often complex and expensive in construction, and somewhat difficult to assemble and to attach to the lawn mowers. Further, there was not provided in the prior art the provision of a system for enabling the hitches to be utilized with a number of different constructions of towed lawn mowers, such as occur amongst the lawn mowers being manufactured and distributed at this time.

SUMMARY OF THE INVENTION

The present invention provides a hitch construction for connecting a push-type lawn mower, having an engine for rotating the blade thereof, for towing behind a self-propelled lawn mower of the riding type. The hitch is constructed so that the towed lawn mower may be positioned laterally of either side of the towing lawn mower. To this end, there is provided on the towing lawn mower a trunnion, and a tow bar which is of L-shape, having a finger engaged in the trunnion, and the arm extending laterally to one side or the other. On either side of the trunnion are a pair of releasable securing devices for the arm, so as to secure it in position to extend either to the left or to the right. These securing devices each takes the form of a pair of spaced apart lugs, for receiving the arm between them, there being apertures through the lugs through which a pin is passed, in order to releasably lock the arm in position between the two selected lugs.

The towed mower is provided with a generally vertically extending post, having a plurality of horizontal apertures. A block is provided, having a bore for receiving the post, and having a transverse, threaded bore. The outer end of the L-shaped arm is also threaded. Thus, the block may be positioned at a selected height, so as to be useable with lawn mowers having different height at the point at which the post is attached. In addition, since various lawn mowers of the push-type have differing widths, the block is threaded along the arm in order to position the towed mower at the proper lateral place behind the towing mower. The block is supported on the post by suitable pins extending through selected apertures of the post.

The present invention also contemplates the provision of a plurality of connectors for connecting the post to the towed mower. Since the towed, push-type mowers are made by a number of manufacturers, with differing constructions, one or another of the plurality of connectors or attachment devices will be utilized for cooperating with the particular towed lawn mower.

Among the objects of the present invention are to provide a hitch for connecting a towed lawn mower to a towing, riding lawn mower, which hitch is able to be positioned readily so as to tow the towed lawn mower laterally on either side of the towing lawn mower.

Another object of the present invention is to provide a hitch construction which is readily constructed, inexpensive, and which may be readily positioned for towing operation.

Still another object of the present invention is to provide a hitch which will enable ready adjustment of the lateral positioning of the towed lawn mower relative to the towing lawn mower, so that accommodation may be made between various makes, models and constructions of lawn mowers to provide for the effective mowing of a pair of adjacent paths.

A still further object of the present invention is the provision of a hitch which will enable the attachment and towing of differing lawn mowers having different heights of attachment points.

A still further object of the present invention is to provide a lawn mower hitch including an assemblage of connectors or attachments for enabling the hitch to be attached to lawn mowers having different constructions.

Other objects and many of the attendant advantages of the present invention will be readily understood from the following specification and drawings.

BRIEF DESCRIPTION OF THE DRAWINGS

FIG. 3 is an elevational view, with parts in section and broken away, taken on the line 3—3 of FIG. 1.

FIG. 4 is a view taken on the line 4—4 of FIG. 3, and in the direction of the arrows thereof.

FIG. 5 is a cross sectional view taken on the line 5—5 of FIG. 3.

DESCRIPTION OF THE PREFERRED EMBODIMENTS

Figure 1:
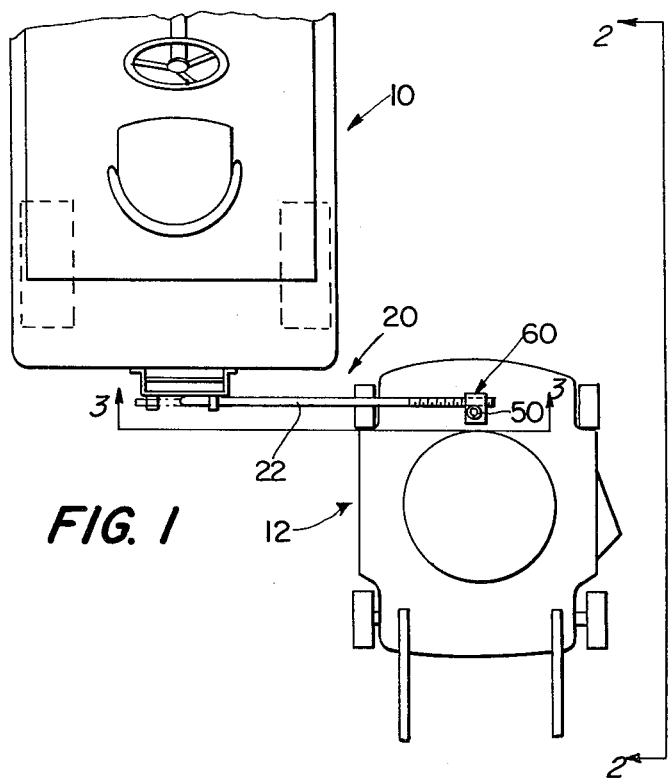
FIG. 1 is a plan view of a towing lawn mower, a hitch in accordance with the present invention, and a towed lawn mower.
Figure 2:
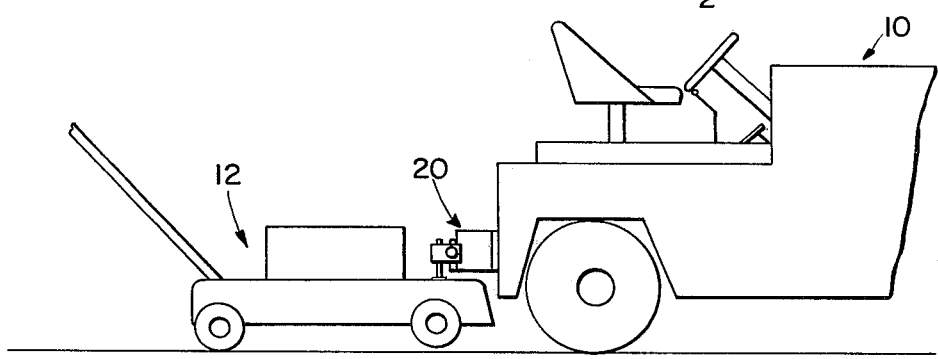
FIG. 2 is an elevational view taken on the line 2—2 of FIG. 1.

Referring now to the drawings, wherein like or corresponding reference numerals are used to designate like or corresponding parts throughout the several views, there is shown in FIG. 1 a self-propelled riding lawn mower, generally designated 10, and behind and laterally thereof, a push-type lawn mower 12, the push-type lawn mower 12 having a plurality of wheels, a deck or hull, an engine supported on the hull, and a rotary blade beneath the deck or hull for mowing grass. Connected to both the towing mower 10 and the towed mower 12 is a hitch, generally designated 20, and including a bar 22.

Referring now to FIG. 3, there is shown the rear plate 14 of the towing mower 10, having attached to it a support plate 24. As is seen in FIG. 4, the support plate 24 includes a pair of generally parallel legs 26 and 28, integrally connected to a transverse plate 32. At its free end, leg 26 is provided with a flange 26a, and fasteners 26b extend through the flange 26a and the rear plate 14 of the towing mower 10. Similarly, leg 28 is providing with a flange 28a, and similar fasteners 28b pass through the flange 28a and the rear plate 14. A brace 34 may be provided between the legs 26 and 28, for added strength.

There is secured to the transverse plate 32 a trunnion 36, having a vertical bore. Journalled in the bore of trunnion 36 is a finger 22a of the L-shaped bar 22. Thereby, bar 22 may be readily placed either in the full line position shown in FIG. 3, or in the alternate, dotted line position shown therein.

In order to secure the bar 22 in either of its two positions, there are provided a pair of releasable securing devices 38 and 40. The device 40 includes a pair of outstanding lugs 42 and 44, providing with aligned apertures. A locking pin 46 is placed through the apertures of the lugs 42 and 44, and thereby secures the bar 22 between the lugs 42 and 44 and also secures bar 22 in the full line position shown.

As will be readily understood, in order to move the bar 22, it is only necessary to remove the locking pin 46, rotate the bar 22 by the journalling of the finger 22a in the bore of trunnion 36, and to cause the bar 22 to pass between the lugs of the locking device 38, and then place the pin 46 in the apertures in the lugs of the locking device 38. The arm 22b of the L-shaped rod 22 is thereby caused to extend either to the right side or the left side of the towing mower 10, and to be securely held in either position. The rod 22, formed by the arm 22b and the finger 22a is always in a vertical plane in the embodiment herein disclosed.

In FIG. 5, there may be seen the transverse plate 32, together with the securing device 40, including the lugs 42 and 44, and the locking pin 46 extending through the apertures in the lugs 42 and 44. Also, there is shown the arm 22b securely held in position between the lugs 42 and 44 by the locking pin 46.

A post 50 is provided, secured to the deck 16 of the towed mower 12. The post 50 may have a flange 52 at its lower end, there being a plate 54 on the underside of the deck 16, and securing devices 56 extending through the plate 54, and deck 16, and being threaded into the flange 52 of the post 50. Post 50 may be seen to be provided with a series of transverse apertures 58. A block generally designated 60 has a bore 62 therein, in which the post 50 is received. Locking pins 64 are provided, extending through selected ones of the apertures 58, so as to provide a selected vertical position of the block 60 on the post 50. In that way, the hitch is adaptable to various constructions of lawn mowers, in which the deck 16 or other attachment point is at one or another height above the ground.

The block 60 also contains a second bore, designated 66, bore 66 being threaded, and extending transversely, or horizontally through the block 60. As is clear from FIG. 1, the bores 62 and 66 are non-intersecting.

The arm 22b of L-shaped rod 22 is provided with screw threads 22c, which threadedly engage with the bore 66 of block 60. Thereby, by this screw threaded connection, the block 60 may be placed at a selected position along the arm 22b, to thereby enable the towed lawn mower to be positioned at the desired laterally adjusted place relative to the towing mower 10, to the end that different makes, styles, and sizes of mowers may be connected together, and adjusted in position so as to properly mow a pair of substantially adjacent paths, which may be caused to overlap to a small degree.

As will be understood, for turning operations, there is sufficient spacing between the towing lawn mower 10 and the towed lawn mower 12, as is shown in FIG. 1, so as to prevent interference between them, particularly when the lawn mowers turn. The turning action is facilitated, in addition, by the ability of the block 60 to rotate on the post 50.

The hitch 20 is intended to be used with various types, styles, constructions and sizes of both towing and towed lawn mowers. In FIGS. 1 and 3, the attachment of the post 50 has been effected by drilling suitable holes through the deck 16 of the towed mower 12. This is one of several constructions contemplated.

In order to adapt the hitch 20 to different types, styles and constructions, as well as sizes of lawn mowers, a set or kit of attachments is provided.

Figure 6:
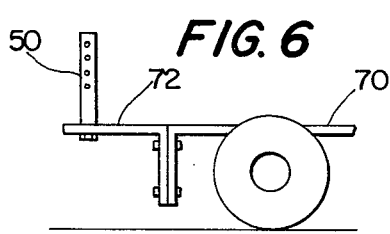
FIG. 6 is an elevational view, partly schematic, showing a first type of lawn mower, with an attachment connected to it.

Referring now to FIG. 6, there is shown the front portion of a lawn mower 70 of the push-type, and an L-shaped member 72 connected to the front portion of the deck thereof by suitable fasteners. The post 50 is connected to the L-shaped member 72, one portion of which will be seen to be substantially level with the deck of the lawn mower 70.

Figure 7:
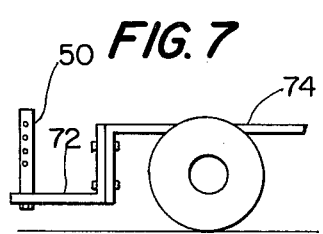
FIG. 7 is a view similar to FIG. 6, showing a second type of lawn mower, and with an attachment.

In FIG. 7, there is shown a lawn mower 74, and the L-shaped attachment or connector 72 as shown in FIG. 6, but connected so that the portion thereof to which the post 50 is attached is at a substantially lower level than the deck of the lawn mower 74. Thus, the deck of the lawn mower 74 is substantially higher than the deck of the lawn mower 70.

Figure 8:
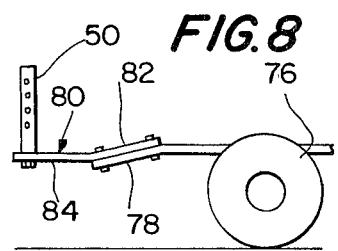
FIG. 8 is an elevational view showing another lawn mower construction, with another type of attachment.

In FIG. 8 there is shown a lawn mower 76, in which the front portion of the deck slopes downwardly and forwardly, as shown at 79. The attachment 80 includes a first portion 82, which is in face to face engagement with the sloping portion 78, secured thereto by suitable fastening elements, the attachment 80 having a second portion 84 which is horizontal, and to which the post 50 is attached.

Figure 9:
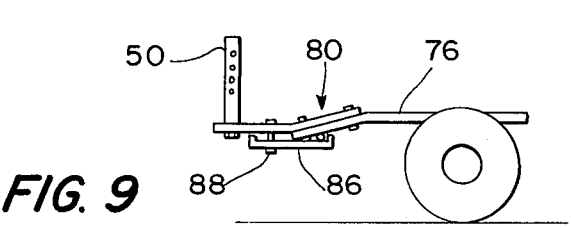
FIG. 9 is an elevational view, showing still another embodiment of an attachment for the post forming a part of the hitch of the present invention.

FIG. 9 discloses an alternate embodiment for attachment of the post 50 to the lawn mower 76, in this case there being provided a clamping plate 86, and bolt 88, to further secure the attachment 80 to the deck of the lawn mower 76.

Figure 10:
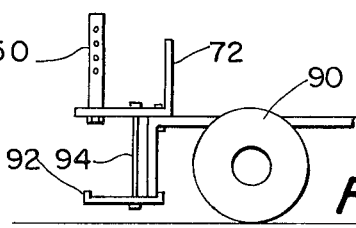
FIG. 10 discloses still another attachment to the construction.

In FIG. 10, there is shown a lawn mower 90, an L-shaped member 72, and a clamping attachment including a lower plate 92 and a bolt 94 for attaching the L-shaped member 72 to the front skirt of the deck of the lawn mower 90. The post 50 will be seen to be attached to the L-shaped member 72.

There has been provided a hitch for hitching together a towing and a towed lawn mower, enabling the towed lawn mower to be positioned laterally on either side of the towing mower. The hitch includes a rod which may be readily moved between two alternate positions, for either left hand or right hand towing. Further, the hitch is constructed of readily available materials, is inexpensive, and is easy to assemble. The herein disclosed hitch provides for both lateral and vertical adjustment of the parts thereof, in order to accommodate to both towed and towing lawn mowers of different sizes, styles and constructions. Further, there has been provided a set or kit of attachments, enabling the present hitch to be attached to a large variety of push-type lawn mower constructions, so that the hitch is not, accordingly, confined to use with a particular construction or size of towed, push-type lawn mower.

It will be obvious to those skilled in the art that various changes may be made without departing from the spirit of the invention, and therefore the invention is not limited to what is shown in the drawings and described in the specification but only as indicated in the appended claims.

I claim:

1. A hitch for connecting a towed mower to a towing mower comprising:
    a trunnion on said towing mower having the axis thereof substantially vertical,
    an L-shaped rod in a substantially vertical plane having a finger portion in said trunnion and an extending arm,
    means for releasably securing said rod in either of two positions in which said arm extends to one side or the other of the towing mower,
    and means for connecting said rod to a towed mower, whereby said towed mower may be selectively positioned laterally on either side of said towing mower.

2. The hitch as set forth in claim 1, wherein said releasable securing means comprises a pair of releasable securing devices, one located on either side of the trunnion.

3. The hitch as set forth in claim 2, wherein each said securing device comprises a pair of lugs receiving said arm between them, and releasable means for selectively holding said arm in said lugs.

4. The hitch of claim 3, said last mentioned means comprising aligned apertures in said lugs, and a locking pin in said apertures to prevent withdrawal of said arm from between said lugs.

5. The hitch of claim 1, wherein said securing means comprises two pairs of vertically spaced, horizontal lugs, one pair on either side of said trunnion, said arm lying between a said pair of lugs.

6. The hitch of claim 1, wherein said last mentioned means comprises a post, means for connecting said post to said towed mower, and means for connecting said post and said arm.

7. The hitch of claim 6, wherein said means for connecting said post and said arm comprises means for adjustably connecting said post to said arm.

8. The hitch of claim 6, wherein said last mentioned means comprises means for connecting said arm to said post at one of a plurality of selected positions therealong.

9. The hitch of claim 8, wherein said last mentioned means comprises means for connecting said post to said arm at one of a plurality of selected positions therealong.

10. The hitch of claim 6, said last mentioned means comprising a block, means for adjustable connecting said block to said post, and means for connecting said arm to said block.

11. The hitch of claim 10, said last mentioned means comprising a threaded connection between said block and said arm.

12. The hitch of claim 1, said last mentioned means comprising a post, means for attaching said post to said towed mower, said post having transverse apertures therethrough, a block journalled on said post, pins extending through selected apertures to receive said block in a selected position on said post, said block having a transverse threaded bore, and said arm being threaded and in threaded engagement with said bore of said block.

13. The hitch of claim 1, wherein said means for connecting said rod to a towed mower comprises a post, and means for connecting said post to the towed mower comprising an attachment selected from a set of attachments each constructed for engagement with a towed mower of a particular configuration, the said selected attachment constructed for engagement with a particular towed mower to be towed.

14. The hitch of claim 13, wherein said set of attachments comprises:
    (a) a first attachment comprising an L-shaped member,
    (b) a second attachment comprising a plate having a first portion for engaging a sloping surface of a lawn mower and a second portion which is in a horizontal plane when said first portion is attached in facing engagement to the sloping surface of a lawn mower,
    (c) a flange attached to said post, and
    (d) securing means for said first and second attachments.

15. A hitch for connecting a towed mower to a towing motor comprising:
    a trunnion on said towing mower,
    an L-shaped rod having a finger portion in said trunnion and an extending arm,
    means for releasably securing said rod in either of two positions in which said arm extends to one side or the other of the towing mower,
    and means for connecting said rod to a towed mower comprising a post, means for connecting said post to said towed mower, and means for connecting said arm to said post at one of a plurality of selected positions therealong.

* * * * *